United States Patent [19]

Hertzenberg et al.

[11] Patent Number: 5,073,668

[45] Date of Patent: Dec. 17, 1991

[54] PROCESS FOR THE DEALUMINATION AND ION EXCHANGE OF ZEOLITES

[75] Inventors: Elliot P. Hertzenberg, Wilmington, Del.; Brendan D. Murray, Houston, Tex.; Gary M. Pasquale, Lansdale, Pa.; Bruce H. C. Winquist, Houston, Tex.

[73] Assignee: Shell Oil Company, Houston, Tex.

[21] Appl. No.: 716,154

[22] Filed: Jun. 17, 1991

Related U.S. Application Data

[62] Division of Ser. No. 442,861, Nov. 28, 1989.

[51] Int. Cl.$^5$ .......................... C07C 5/13; B01J 29/18
[52] U.S. Cl. ...................................... 585/739; 502/66; 502/78; 502/74
[58] Field of Search .................... 585/739; 502/78, 74, 502/66

[56] References Cited

U.S. PATENT DOCUMENTS

| | | | |
|---|---|---|---|
| 3,442,794 | 5/1969 | Van Helden et al. | 208/111 |
| 3,475,345 | 10/1969 | Benesi | 252/455 |
| 3,507,931 | 4/1970 | Morris et al. | 260/683.65 |
| 3,597,155 | 8/1971 | Flanigen | 23/111 |
| 4,018,711 | 4/1977 | Bertolacini | 252/455 Z |
| 4,665,272 | 5/1987 | Bakas | 585/739 |
| 5,019,661 | 5/1991 | Mole | 585/739 |

*Primary Examiner*—Asok Pal
*Assistant Examiner*—Nhat Phan
*Attorney, Agent, or Firm*—Pamela J. McCollough

[57] ABSTRACT

The instant invention comprises a process for concurrently dealuminating and ion exchanging an acid stable sodium ion-containing zeolite by contacting the zeolite with an about 0.5 M to about 3 M nitric acid solution containing ammonium nitrate in an amount sufficient to fully exchange the sodium ions for ammonium and hydrogen ions at a temperature of at least about $-10°$ C. The instant invention also relates to the zeolites thus prepared by the instant process and catalysts prepared utilizing these zeolites.

15 Claims, No Drawings

PROCESS FOR THE DEALUMINATION AND ION EXCHANGE OF ZEOLITES

This is a division, of application Ser. No. 442,861, filed Nov. 28, 1989.

FIELD OF THE INVENTION

This invention relates to a process for the combined dealumination and ion exchange of zeolites, thereby increasing the silica to alumina ratio and converting the sodium form of the zeolites into the ammonium hydrogen form of the zeolites. This invention further relates to zeolites prepared utilizing this process, catalysts prepared utilizing these zeolites and a hydroisomerization process utilizing the catalysts thus prepared.

BACKGROUND OF THE INVENTION

It is well known that the aluminum content of a zeolite determines to a great extent its properties such as catalytic activity, sorption and ion-exchange capacity. It is also known that acids such as strong mineral acids can be used to modify crystalline aluminosilicate powders through decationization and dealumination. It is further known that ammonium compounds have been used to convert crystalline aluminosilicates from alkali and/or alkaline metal cation form to the ammonium form, which upon calcination produces the hydrogen form.

U.S. Pat. No. 3,475,345 discloses a method of converting aluminosilicate zeolites to the hydrogen form utilizing a three-step treatment of the powdered zeolite which consists of: 1) a hot acid treatment, 2) a cold acid treatment and 3) treatment with an ammonium compound.

U.S. Pat. No. 3,442,794 discloses a method for pretreatment of aluminosilicates in the hydrogen form which is a separately performed two-step treatment with an acid compound and an ammonium compound.

Treatment of the aluminosilicates with acids has not only been effective for conversion to the hydrogen form, but also has been used as a means for increasing the silica to alumina ratio. For example, U.S. Pat. No. 3,597,155 teaches that if a mordenite powder is subjected to an acid treatment, an increase in the silica to alumina ratio is effected.

U.S. Pat. No. 3,507,931 teaches that a silica to alumina ratio above about 20:1 significantly improves the isomerization of light hydrocarbons and U.S. Pat. No. 4,018,711 teaches that isomerization performance is enhanced when a pretreated mordenite having a silica to alumina ratio of at least 19:1 is incorporated in a catalytic composition. U.S. Pat. No. 4,665,272 teaches the superior isomerization performance of a catalyst composite having a surface area of at least 580 m$^2$/g, as determined by the Langmuir isotherm technique, and which is approximately the same as 549 m$^2$/g if measured by the 8[T method.

The present invention provides a convenient and inexpensive method for concurrently decreasing the framework aluminum content of sodium zeolites and ion exchanging the sodium ions for ammonium and hydrogen ions to form an ammonium hydrogen zeolite.

It has been found that the addition of ammonium nitrate to nitric acid during dealumination of a zeolite dramatically improves the paraffin hydroisomerization activities of finished catalysts.

SUMMARY OF THE INVENTION

The instant invention comprises a process for concurrently dealuminating and ion exchanging an acid stable sodium ion-containing zeolite by contacting said zeolite with a 0.5 M to about 3 M (moles of acid per liter of solution) nitric acid solution containing ammonium nitrate in an amount sufficient to fully exchange said sodium ions with ammonium and hydrogen ions at a temperature of at least about $-10°$ C.

The instant invention also relates to the zeolites prepared by the instant process and catalysts prepared utilizing these zeolites. The instant zeolites are useful as catalysts, catalyst supports, adsorbents and ion exchange materials. The catalysts prepared utilizing these zeolites are particularly useful in a hydroisomerization process.

DETAILED DESCRIPTION OF THE INVENTION

Zeolites are crystalline aluminosilicate minerals of a cage-network structure with pores a few angstroms in diameter. Some of the common materials, such as zeolite Y (faujasite) or zeolite A have a three dimensional structure with pore intersections ("supercages") somewhat larger than the pore size. Others such as zeolite L and mordenite have channels. For each type of zeolite a theoretical crystal structure or "framework" can be specified which is composed of interconnected silicon atoms, aluminum atoms and oxygen atoms arranged in an ordered fashion. The aluminum found within this framework is referred to as "framework aluminum". A typical zeolitic framework comprises corner-sharing $SiO_4$ and $AlO_4$ tetrahedra. Excess negative charges in the Si—O—Al framework are balanced by the presence of suitable positive ions such as ions of hydrogen, ammonium, alkali metal, alkaline earth metal, rare earth metal, etc. Each specific zeolite will have either a specific Si to Al ratio or specified range of Si to Al ratios that correspond to the theoretical crystal structure of such zeolite type. Since the Si to Al ratio can affect the catalytic activity, and sorption and ion-exchange capacity of a zeolite, techniques to fine tune the Si to Al ratio can be very important. The instant process provides a means whereby the Si to Al ratio can be increased and controlled.

Essentially any acid stable crystalline zeolitic aluminosilicate can be utilized in the instant process to prepare the compositions of the instant invention. As used herein, "acid stable" shall refer to a crystalline zeolitic aluminosilicate which loses less than 30% of its surface area, as measured by the BET method, when subjected to 1.0 M nitric acid at 50° C. for 5 hours. The acid stability of a particular crystalline zeolitic aluminosilicate can readily be determined by one of ordinary skill in the art with a minimal amount of routine experimentation. For those zeolites which are not acid stable, a pretreatment of steaming at elevated temperatures may be used to remove sufficient alumina to make the zeolite more acid stable. The zeolites which can be utilized in the instant invention include both synthetic and naturally occurring zeolites. Descriptions of synthetic zeolites are found in the book "Zeolite Molecular Sieves-Structure, Chemistry and Use," by Donald W. Breck, 1974, John Wiley & Sons, incorporated by reference herein. Descriptions of certain naturally occurring zeolites are found in the aforementioned book by Breck, in the book "Molecular Sieves-Principles of Synthesis and Identification", R. Szostak, Van Nostrand Reinhold, New York, 1989, both incorporated by reference herein, and in other known references.

In a preferred embodiment, the crystalline aluminosilicate material which is utilized in this invention is mordenite. While mordenite is naturally occurring, a variety of synthetic mordenites are available in a powder form. It is preferred that the mordenite be in the sodium form and have a silica to alumina ratio ($SiO_2$ to $Al_2O_3$ molar ratio) of about 5:1 to about 15:1.

In the present invention, an acid stable sodium ion-containing zeolite having a silica to alumina ratio greater than about 5:1, preferably in the range of from about 5:1 to about 15:1, and more preferably about 10:1, is contacted with an aqueous solution or solutions of ammonium nitrate in nitric acid to produce an ammonium hydrogen zeolite having a silica to alumina ratio in the range of from about 15:1 to about 26:1. The concentration of the nitric acid has a large effect on the silica to alumina ratio. As the concentration of the nitric acid increases, the silica to alumina ratio increases. The concentration of the nitric acid may vary from about 0.5 M to about 3 M, but it is preferred that the nitric acid concentration be in the range of from about 1 M to about 2.5 M in order to yield an ammonium hydrogen zeolite having a silica to alumina ratio in the desired range of 15:1 to 26:1.

The amount of the ammonium nitrate which is added to the nitric acid solution is not critical, but should be sufficient to fully exchange the sodium ions in the zeolite with ammonium and hydrogen ions in order to convert the sodium zeolite to an ammonium hydrogen zeolite. As used herein "fully exchange" means that greater than about 95%, preferably greater than about 98% and more preferably, greater than about 99% of the sodium ions have been exchanged for ammonium and hydrogen ions. Typically, the concentration of ammonium nitrate which is added to the nitric acid solution will be in the range of at least about 1 M, preferably in the range of from about 2 M to about 15 M and more preferably in the range of from about 3 M to about 10 M.

The temperature and time of contact are not critical, but do affect the dealumination rate. Longer contact times and higher contact temperatures result in higher silica to alumina ratios. Preferred temperatures are in excess of about 20° C., preferably in excess of about 40° C. up to about 200° C. Most preferred contact temperatures are in the range of from about 40° C. to about 100° C. Contact pressures are typically atmospheric, although higher and lower pressures can be utilized. Contact times are preferably greater than about 30 minutes and more preferably greater than about one hour.

It is advantageous to perform the contact of the zeolite with the ammonium nitrate in nitric acid solution at least once. The number of contacts with the ammonium nitrate/nitric acid solution affects the silica to alumina ratio with higher silica to alumina ratios being obtained with multiple treatments. It is preferred that the number of contacts be in the range of from about two to about four. The most preferred number of contacts to yield a zeolite having the desired silica to alumina ratio is two.

After the zeolite is contacted with the ammonium nitrate-containing nitric acid solution, the zeolite is in the ammonium hydrogen form. The ammonium hydrogen form of the zeolite will typically have a silica to alumina ratio in the range of from about 15:1 to about 26:1, preferably from about 17:1 to about 23:1. As used herein, "ammonium form" refers to a zeolite having more than 50% of its exchange sites occupied by ammonium ions, "hydrogen form" refers to a zeolite having more than 50% of its exchange sites occupied by hydrogen ion$ and "ammonium hydrogen form" refers to a zeolite having its exchange sites occupied by a mixture of ammonium ions and hydrogen ions. While the zeolite may be utilized in the ammonium hydrogen form, the zeolite is particularly useful when converted by calcination into the hydrogen form at a temperature sufficient to at least partially convert the ammonium hydrogen form to the hydrogen form. Typically, the zeolite is calcined at a temperature greater than about 350° C., preferably in the range of from about 350° C. to about 650° C., and more preferably, in the range of from about 475° C. to about 575° C. When other catalytic components are added to the zeolite, the conversion of the ammonium hydrogen form of the zeolite into the hydrogen form may take place either before or after mixing the zeolite with the other catalytic components.

The invention is also directed to catalysts prepared utilizing zeolites which have been dealuminated and ion exchanged according to the invention. These zeolites are particularly suitable for use in the preparation of acidic metal-containing catalysts. Metal can be incorporated into the zeolite by conventional methods such as, for example, impregnation, ion exchange, co-mullig. Metal is incorporated into the zeolite generally from any solution in which the metal can exist in a dissolved or complexed form. The use of cationic metal complexes results in ion-exchange of the metal for ammonium and hydrogen ions and impregnation can be carried out with a compound such as, for example, chloroplatinic acid in which the metal exists in an anionic state. Preferably, the metal is incorporated into the zeolite by means of co-mulling with a compound in which the metal exists in a cationic complex. Especially suitable for incorporating hydrogenation metals into the zeolite are ammonium ion-containing solutions wherein the metal exists in the form of a cationic complex such as, for example, tetraamine platinum nitrate. It is preferred that the metal be a Group VIII metal, particularly a noble metal, and preferable that the metal be platinum, palladium or mixtures thereof. It is especially preferable that the metal be platinum.

The amount of metal incorporated in the catalyst should be at least about 0.01 percent by weight, basis finished catalyst, preferably between about 0.01 percent by weight and 10 percent by weight, more preferably between about 0.1 percent by weight and about 5 percent by weight, and most preferably, between about 0.2 percent by weight and about 1 percent by weight. The surface area of the finished catalyst is preferably at least about 450 $m^2/g$ as measured by the BET method. The catalyst may additionally contain inorganic oxides which also serve as binders. Non-limiting examples of such oxides include aluminas, clays, silicas, silica-aluminas, magnesia, titania, zirconia and boria. The oxide or binder may be added to the catalyst composition at any point, that is, before, during or after the metal is deposited on the zeolite.

Catalysts prepared utilizing zeolites dealuminated and ion exchanged according to the invention are particularly useful for the hydroisomerization of normal paraffins in the presence of hydrogen. The normal paraffins which are subjected to the hydroisomerization treatment contain preferably about 4 to about 10 carbon atoms per molecule and especially about 4 to about 7 carbon atoms per molecule. The hydroisomerization process is usually carried out at a temperature of about 150° C. to about 300° C., preferably from about 230° C. to about 280° C., a pressure of about 3 to about 50 bar gage, preferably from about 10 to about 40 bar gage, a space velocity, based on hydrogen mordenite, of about 0.5 to about 10 kg/kg/hr, preferably from about 1 to about 5 kg/kg/hr, and a molar ratio of hydrogen to feed of about 0.5:1 to about 10:1.

The hydroisomerization of low molecular weight normal paraffins is an attractive method for the upgrading of light gasoline fractions, such as tops obtained by straight-run distillation. In comparison with isoparaffins with the same number of carbon atoms, normal paraffins have a low octane number. Therefore, their presence in light gasoline fractions is undesirable. By conversion of the normal paraffins into isoparaffins, the octane number is increased.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustration purposes and are not to be construed as limiting the invention.

ILLUSTRATIVE EMBODIMENTS

Example 1

A mixture of 1500 grams of sodium mordenite having the following properties: surface area—430 square meters per gram; average crystallite size—1 to 3 microns; cyclohexane adsorption—5 to 8 weight percent; and molar silica to alumina ratio—9 to 12, 9000 grams of ammonium nitrate and 15 liters of 1.5 M nitric acid was heated to 50° C. and stirred for five hours. The solid material was filtered off and washed with 25 liters of deionized water. This treatment with ammonium nitrate in nitric acid was performed twice with fresh ammonium nitrate and nitric acid each time. After each treatment the solid material was filtered off and washed with water and dried overnight at 120° C. Platinum was added to the zeolite to a level of 0.35 percent by weight by treatment with an aqueous solution containing tetraamine platinum nitrate and an excess of ammonium nitrate prepared by dissolving 8.45 grams of tetraamine platinum nitrate in 308 grams of deionized water and adding to this solution 4.92 grams of ammonium nitrate. The platinum solution was ten co-mulled with 1083 grams of dealuminated mordenite having an LOI (loss of ignition at 750° C. for 2 hours) of 10.6%. The platinum-containing mordenite was uniformly mixed and then 338 grams of pseudoboehmite alumina (Catapal B which is commercially available from Vista Chemical Company) having an LOI of 28.4% was added and allowed to mix. The mixture was extruded and the extrudates were dried in air overnight at 125° C. and then calcined in air at 500° C. for two hours. The properties of the catalyst are presented in Table I.

EXAMPLE 2

Example 2 was carried out in a manner similar to Example 1 except that ammonium nitrate was not added to the tetraamine platinum nitrate solution. The properties of the catalyst are presented in Table I.

EXAMPLE 3

Example 3 was carried out in a manner similar to Example 1 except that ammonium nitrate was not added to the tetraamine platinum nitrate solution. The properties of the catalyst are presented in Table I.

EXAMPLE 4

Example 4 was carried out in a manner similar to Example 1 except that ammonium nitrate was not added to the tetraamine platinum nitrate solution. The properties of the catalyst are presented in Table I.

COMPARATIVE EXAMPLE A

A mixture of 1500 grams of sodium mordenite and 15 liters of 1.5 M nitric acid washheated to 50° C. and stirred for five hours. The solid material was filtered off and washed with water. The solid was then refluxed for one hour with 12 liters of a 2.0 M ammonium nitrate solution. This treatment with ammonium nitrate was performed twice with fresh ammonium nitrate each time. After each treatment the solid material was filtered off and washed with water. Platinum was ion-exchanged into the mordenite to a level of 0.35 percent by weight by treatment with an aqueous solution containing tetraamine platinum nitrate prepared by dissolving 8.45 grams of tetraamine platinum nitrate in 308 grams of deionized water. The platinum-containing mordenite was filtered, washed with water, and dried at 120° C. 1083 grams of the ion-exchanged platinum mordenite was then added to 286 grams of deionized water. The platinum-containing mordenite was well mixed and then 338 grams of alumina having an LOI of 28.4% was added and allowed to mix. The mixture was then extruded and the extrudates were dried in air overnight at 125° C. and then calcined in air at 500° C. for two hours. The properties of the catalyst are presented in Table I.

COMPARATIVE EXAMPLE B

A mixture of 1500 grams of sodium mordenite and 15 liters of 1.5 M hydrochloric acid was heated to 50° C. and stirred for five hours. The solid material was filtered off and washed with water. The solid was then refluxed for one hour with 12 liters of a 2.0 M ammonium nitrate solution. This treatment with ammonium nitrate was performed twice with fresh ammonium nitrate each time. After each treatment the solid material was filtered off and washed with water. Platinum was ion-exchanged into the mordenite to a level of 0.35 percent by weight by treatment with an aqueous solution containing tetraamine platinum nitrate prepared dissolving 8.45 grams of tetraamine nitrate in 308 grams of deionieed water. The platinum-containing mordenite was filtered, washed with water, and dried at 120° C. 1083 grams of the ion-exchanged platinum mordenite was then added to 286 grams of deionized water. The platinum-containing mordenite was well mixed and then 338 grams of alumina having an LOI of 28.4% was added and allowed to mix. The mixture was then extruded and the extrudates were dried in air overnight at 125° C. and then calcined in air at 500° C. for two hours. The properties of the catalyst are presented in Table I.

TABLE I

| | | | Catalyst Properties | | | |
|---|---|---|---|---|---|---|
| | Example 1 | Example 2 | Example 3 | Example 4 | Comparative Example A | Comparative Example B |
| Platinum[a] % wt. | 0.35 | 0.35 | 0.35 | 0.37 | 0.35 | 0.35 |
| Sodium[b] ppm | 38 | 19 | 150 | 170 | <40 | <40 |
| Surface Area[c] m$^2$/g | 541 | 520 | 540 | 493 | 491 | 495 |
| Bulk Density[d] gm/cc | 0.71 | 0.71 | 0.70 | 0.70 | 0.71 | 0.70 |
| SiO$_2$/Al$_2$O$_3$ Molar Ratio of Mordenite | 20.2 | 18.6 | 20.0 | 21.4 | 19.1 | 20.6 |

[a] Weight percent determined by atomic absorption spectroscopy.
[b] Parts per million determined by atomic absorption spectroscopy.
[c] BET, by nitrogen adsorption/desorption, Micromeritics Digisorb 2500 Instrument, at a relative nitrogen pressure of P/P$_o$ = 0.03 Torr.
[d] 180 cc volume fully settled in a graduated cup and weighed.

Catalyst Testing

The catalysts in Examples 1, 2, 3 and 4 and Comparative Examples A and B were used to hydroisomerize a 50:50 (by volume) n-pentane/n-hexane feedstock. The conditions used for testing were the following:

| | |
|---|---|
| Temperature | 260° C. |
| Pressure | 450 psig |
| LHSV | 1.6 kg/kg/hr. |
| Molar H$_2$:Feed | 1.25 |
| Catalyst Age | 100 hrs. |

The results of these experiments are presented in Table II.

TABLE II

| | Catalyst Performance |
|---|---|
| Catalyst | % wt. i-C$_5$/total C$_5$ in Product |
| Example 1 | 69.5 |
| Example 2 | 69.9 |
| Example 3 | 69.1 |
| Example 4 | 69.5 |
| Comparative Example A | 59.5 |
| Comparative Example B | 61.5 |

What is claimed is:

1. A process for the hydroisomerization of normal paraffins having from about 4 to about 10 carbon atoms which comprises contacting said paraffins with hydrogen and a zeolite catalyst comprising at least one metal selected from Group VIII and a zeolite prepared by a process which comprises contacting said zeolite with an about 0.5 M to about 3 M nitric acid solution containing ammonium nitrate in an amount sufficient to fully exchange said sodium ions in said zeolite for ammonium and hydrogen ions and subsequently calcining at a temperature in the range between about 350° C. and about 650° C.

2. The process of claim 1 wherein said hydroisomerization process is carried out at a temperature in the range of from about 150° C. to about 300° C. and a pressure in the range of from about 3 bar gage to about 50 bar gage.

3. The process of claim 1 wherein said Group VIII metal in said catalyst is platinum.

4. The process of claim 3 wherein said catalyst contains from about 0.01 to about 10 percent by weight of platinum.

5. The process of claim 1 wherein said Group VIII metal in said catalyst is palladium.

6. The process of claim 5 wherein said catalyst contains from about 0.01 to about 10 percent by weight of palladium.

7. The process of claim 1 wherein said Group VIII metals in said catalyst are platinum and palladium.

8. The process of claim 7 wherein said catalyst contains from about 0.01 to about 10 percent by weight platinum and from about 0.01 to about 10 percent palladium.

9. The process of claim 1 wherein said nitric acid solution has a concentration in the range of from about 1M to about 2.5 M.

10. The process of claim 1 or 9 wherein said ammonium nitrate which is added to said nitric acid solution has a concentration of at least about 1 M.

11. The process of claim 1 or 9 wherein said ammonium nitrate which is added to said nitric acid solution has a concentration in the range of from about 2 M to about 15 M.

12. The process of claim 1 wherein said dealuminated and ion exchanged zeolite has a SiO$_2$/Al$_2$O$_3$ ratio in the range of from about 15:1 to about 26:1.

13. The process of claim 12 wherein said dealuminated and ion exchanged zeolite has a SiO$_2$/Al$_2$O$_3$ ratio in the range of from about 17:1 to about 23:1.

14. The process of claim 1 wherein said zeolite is contacted with said nitric acid solution containing ammonium nitrate more than once.

15. The process of claim 14 wherein the number of contacting steps is in the range of from two to about four.

* * * * *